No. 705,276. Patented July 22, 1902.
T. MURPHY.
FURNACE.
(Application filed Apr. 26, 1900.)
(No Model.) 2 Sheets—Sheet 1.
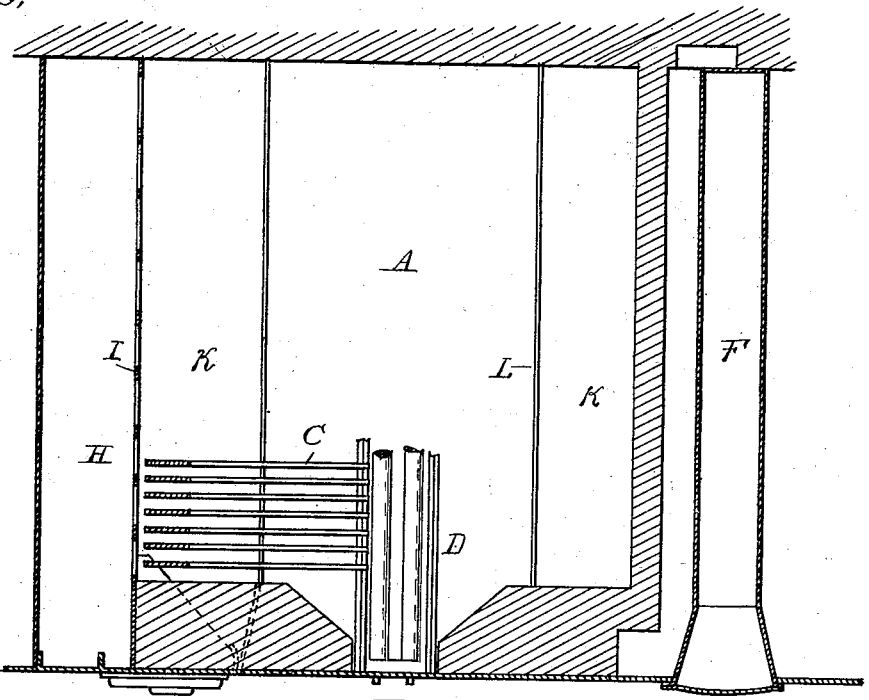
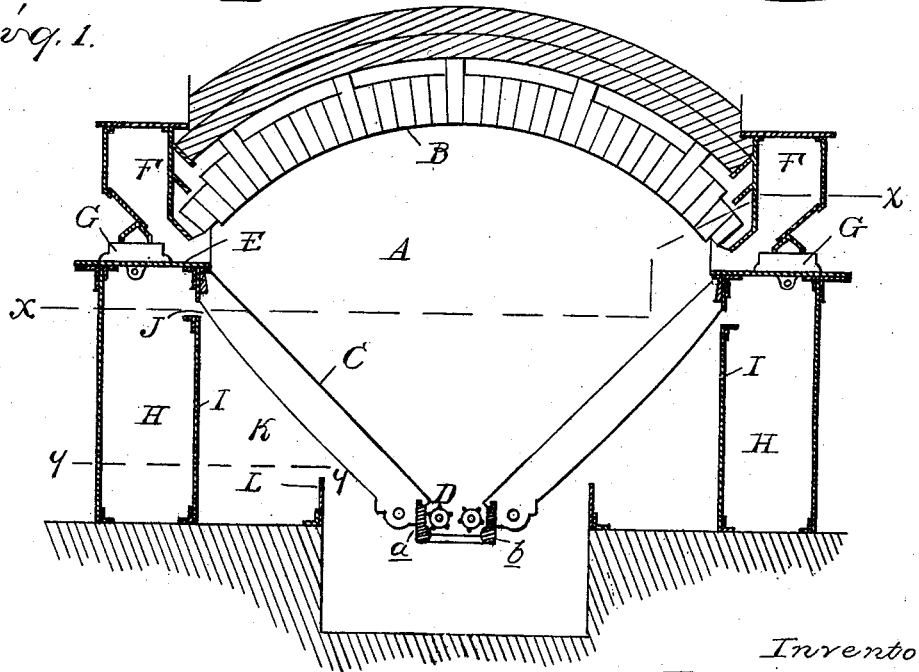
Witnesses
H. C. Smith
M. B. O'Dogherty
Inventor
Thomas Murphy
By Maguire
Attys No. 705,276. Patented July 22, 1902.
T. MURPHY.
FURNACE.
(Application filed Apr. 26, 1900.)
(No Model.) 2 Sheets—Sheet 2.
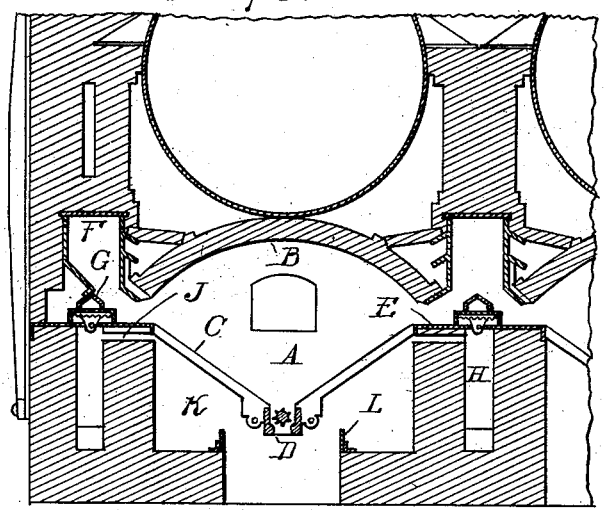
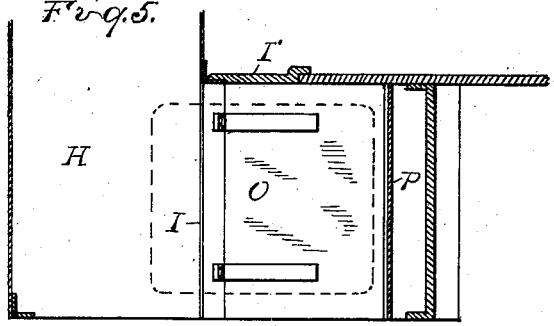
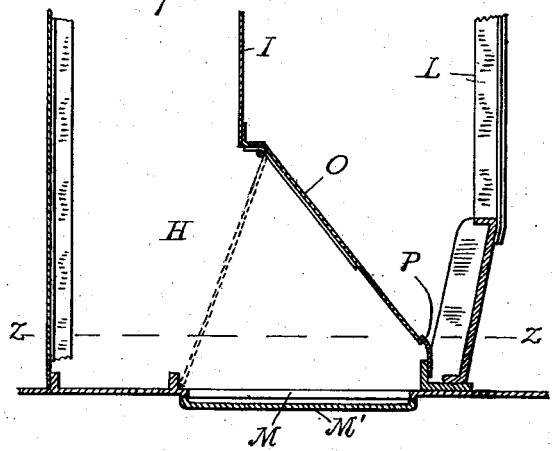
Inventor
Thomas Murphy

UNITED STATES PATENT OFFICE.

THOMAS MURPHY, OF DETROIT, MICHIGAN.

FURNACE.

SPECIFICATION forming part of Letters Patent No. 705,276, dated July 22, 1902.

Application filed April 26, 1900. Serial No. 14,392. (No model.)

*To all whom it may concern:*

Be it known that I, THOMAS MURPHY, a citizen of the United States, residing at Detroit, in the county of Wayne and State of Michigan, have invented certain new and useful Improvements in Furnaces, of which the following is a specification, reference being had therein to the accompanying drawings.

My invention relates to self-feeding furnaces of that type in which the fuel is fed through the wall of the furnace-chamber onto a series of inclined grate-bars extending from said wall downward to a grate-bearer below, in which is arranged a rotary clinker-bar.

It is the object of my present invention to provide means for regulating the admission of air below the grates in such a manner as to produce a more uniform fire and to prevent the burning out of the grate-bars, and, further, to improve the construction and arrangement of parts, as hereinafter described and claimed.

In the construction of furnaces of the type above mentioned it is customary to feed air into the ash-pit through doors or dampers in the boiler-front. The air thus entering passes in at the bottom of the pit and is drawn upward through the grates by the draft of the furnaces. With such an arrangement of air-feed it has been found in practice that the greater part of the air-current will pass through the grates at the lower portion thereof, thus intensifying the fire at that point more than at the upper portion of the bars. Moreover, it has been found that as the cool air will naturally remain in the lowest part of the chamber the air in the angular portion of the chamber between the upper portions of the grate and the wall of the furnace becomes intensely heated, with the consequence that the grate at that point is very apt to burn out. With my improvement I avoid this twofold difficulty by admitting the air into the chamber below the grates at the apex or highest portion of the chamber beneath said grate, thus furnishing the air to the upper part of the chamber and also admitting the air directly beneath that portion of the grate where the fire is most in need of draft.

In the drawings, Figure 1 is a vertical cross-section through a furnace to which my improvement is applied. Fig. 2 is a horizontal section therethrough on line $x\ x$, Fig. 1. Fig. 3 is a section similar to Fig. 1, showing a modified construction. Fig. 4 is a horizontal section on line $y\ y$, Fig. 1. Fig. 5 is a section on line $z\ z$, Fig. 4.

A is the furnace-chamber, B the arch, and C a series of inclined grate-bars resting at their lower ends upon the grate-bearers D and at their upper ends against the plate E at the side of the furnace. This plate forms the coking plate or shelf over which the fuel contained in the magazine F is fed and from which it is periodically introduced into the furnace by the reciprocation of the pusher G, the construction thus far described forming no part of my present invention and being substantially the same as that shown and described in my prior patents, Nos. 316,641 and 316,642, dated April 28, 1885.

It is customary in the construction of furnaces of this type to arrange directly beneath the pusher G a dust-pit H, in which the dust and fine particles of fuel which work through the crevices around the pusher may collect. In my present construction I preferably introduce the air below the grates through this dust-pit, and therefore arrange the air-inlet damper of the furnace-front so as to communicate with this pit. At the upper end of this dust-pit is formed a series of apertures J, communicating with the ash pit or chamber below the grate-bars, at the upper angle thereof, as shown in Figs. 1 and 3 of the drawings. In the construction shown in Fig. 1 this dust-pit is separated from the ash-pit by a thin diaphragm I, preferably formed of sheet metal, while in the construction shown in Fig. 3 it is formed in the side wall of the furnace. With both constructions the air admitted to the dust-pit first acts as a cooling medium for the pusher G, which prevents overheating of the same, and then passing through the apertures J passes into the ash-pit K. Here it will first come in contact with the upper portion of the grate-bars; but as the comparative cool air which is admitted through the apertures is much heavier than the hot air of the chamber it will distribute itself through said chamber, and thus reduce the temperature in all portions, preventing the burning of the grates at any point. With furnaces of the type described, the fuel being pushed laterally from the magazine onto the upper end of the bars, there will be a portion at the upper end of said bars which remains comparatively dead or but partially ignited, and the tendency is for a considerable quantity of said fuel to screen through the grate-bars and drop into the ash-pit. To avoid wasting this portion of the fuel, I divide the chamber beneath the grate-bars into sections separated by a wall or diaphragm L, arranged beneath the central portion of the bars. This diaphragm divides the chamber into a screening-pit on the one side and an ash-pit on the other, the unconsumed fuel dropping into the screening-pit and the ash passing between the bars at the lower point and dropping into the ash-pit. The diaphragm L also serves to direct cool air descending from the upper part of the chamber against the grate-bars. In order to draw out the fuel collected in the screening-pit, I provide in the furnace-front a door-opening M and door M' therefor, and, as shown in Fig. 4 of the drawings, this door also forms a means of access to the dust-pit. As, however, it is desired to feed the air from the dust-pit by way of the apertures J into the chamber beneath the grate-bars, it is necessary to provide a damper or door for preventing the direct admission of air into the screen-pit through the door-opening M. For this purpose I preferably provide the door O, which is shown in the drawings as hinged to the diaphragm I beneath a horizontal plate I' and is adapted to seat upon the flange P, where it shuts off the screening-pit. When it is desired to have access to said pit, said door O may be turned back, as shown in dotted lines, into a position where the dust-pit will be shut off and the screening-pit opened through the door M. Thus but one door is necessary in the furnace-front for communicating with either the screening-pit or dust-pit, and this door may be provided with the draft-dampers for regulating the supply of air through the dust-pit and apertures J to the chamber beneath the grates. The dust in the pit H and the fine fuel in the screening-pit may be taken out from time to time through the door M.

What I claim as my invention is—

1. In a furnace, the combination with an inclined grate, of inclosing walls forming an angular chamber beneath said grate, the wall adjacent to the upper edge of the grate being hollow and having connecting-apertures with the upper angle of the chamber beneath said grate whereby cool air may be introduced in the upper portion of said chamber through said hollow wall.

2. In a furnace, the combination with inclosing walls, a central grate-bearer and grates supported thereon inclining upward to the opposite side walls and forming angular air-chambers therebeneath, of means for introducing a cooling-current from one end of the furnace and distributing it along the opposite upper angles of said chambers beneath the grate.

3. In a furnace, the combination with an inclined grate and the inclosing walls forming an angular chamber beneath said grate of means for introducing a cooling-current into said chamber and distributing it along the upper edge of said grate, deflector for directing the downward current from said upper edge of the grate in an inclined course against said grate at a lower point in said chamber.

4. In a furnace, the combination with an inclined grate a fuel-shelf at the upper edge of said grate, and inclosing walls forming a chamber beneath said shelf and grate, of a division-wall or diaphragm dividing said chamber into two compartments; with a connecting-passage at the upper end of said diaphragm, and means for feeding air into the compartment beneath said shelf, and distributing it through said connecting passage beneath the upper end of the grate.

5. In a furnace, the combination with an inclined grate a fuel-feeding device at the upper end of said grate and walls inclosing a chamber beneath said feeding devices and grate, of diaphragms subdividing said chamber into three compartments formed respectively beneath said fuel-feed and an upper, and a lower portion of said grate said compartments constituting respectively a dust-pit, a screening-pit and ash-pit, and means for feeding air into said dust-pit and therefrom over said diaphragm into said screening and ash pits.

6. A furnace comprising a grate, fuel-feeding devices at one side thereof a wall or diaphragm between said feed devices and grates separating the space thereunder into a dust-pit and a screening and ash pit, a furnace-front having a single door-opening therein communicating with both pits, a door therefor and a second door or damper for shutting off said screening-pit.

7. A furnace comprising a grate, fuel-feeding devices at one side thereof, a furnace-front having a door-opening therein, and a door therefor, a wall or diaphragm between said feed device and grate dividing the space thereunder into a dust-pit and a screening and ash pit, said diaphragm being in line with and cut away or apertured opposite said door-openings, and a door or damper hinged to said diaphragm at the edge of said aperture adapted in one position to cut off said screening and ash pit.

8. A furnace comprising a grate, fuel-feeding devices at one side thereof, a wall or diaphragm between said feed devices and grate dividing the space thereunder into a dust-pit and a screening and ash pit, with an air-passage between said pits at the upper end of said diaphragm, a furnace-front having a single door-opening therein communicating with both of said pits, a dampered door for said opening and a second door or damper adapted in one position to cut off said screening and ash pit, for the purpose described.

9. In a furnace, the combination with an inclined grate and walls inclosing a chamber beneath said grate, of a wall or diaphragm dividing said chamber in two compartments with an air connecting-passage at the upper end of said wall and means for feeding air into the compartment beneath the highest point of the grates and distributing it through said passages into the other compartment and directing it against the under side of the grate.

In testimony whereof I affix my signature in presence of two witnesses.

THOMAS MURPHY.

Witnesses:
JAMES WHITTEMORE,
H. C. SMITH.